US005996381A

United States Patent [19]

Yoneyama

[11] Patent Number: 5,996,381

[45] Date of Patent: Dec. 7, 1999

[54] AUTOMOTIVE DOOR LOCK DEVICE

[75] Inventor: Hajime Yoneyama, Kanagawa, Japan

[73] Assignee: Ohi Seisakusho Co., Ltd., Yokohama, Japan

[21] Appl. No.: 09/282,150

[22] Filed: Mar. 31, 1999

[51] Int. Cl.[6] ........ B60R 25/00

[52] U.S. Cl. ........ 70/237; 292/336.3; 292/DIG. 23; 292/DIG. 27

[58] Field of Search ........ 70/237, 275, 263, 70/264; 292/216, DIG. 23, DIG. 27, 336.3

[56] References Cited

U.S. PATENT DOCUMENTS

| | | | |
|---|---|---|---|
| 4,102,213 | 7/1978 | Smith | 74/110 |
| 4,634,156 | 1/1987 | Shimura et al. | 292/216 |
| 5,106,135 | 4/1992 | Menke et al. | 292/216 |
| 5,803,515 | 9/1998 | Arabia, Jr. et al. | 292/216 |

*Primary Examiner*—Darnell M. Boucher
*Assistant Examiner*—Clifford B Vaterlaus
*Attorney, Agent, or Firm*—Foley & Lardner

[57] ABSTRACT

An automotive door lock device comprises an open lever pivotal between a door latch position and a door unlatch position. The open lever has an engaging lug. A lock/unlock lever is pivotal between lock and unlock positions. A release lever is pivotal between first and second positions. A first sub-lever has one end pivotally connected to the release lever and the other end pivotally connected to the lock/unlock lever. A second sub-lever has one end pivotally connected to the first sub-lever and the other end formed with an actuating arm. The actuating arm is engageable with the engaging lug of the open lever. A spring is used for biasing the second sub-lever toward the first sub-lever. When the lock/unlock lever assumes the unlock position, the pivoting of the release lever from the first position to the second position induces an abutment of the actuating arm with the engaging lug of the open lever thereby to pivot the stopper pawl toward the door unlatch position, and when the lock/unlock lever assumes the lock position, the pivoting of the release lever from the first position to the second position fails to induce such engagement. Furthermore, when, with the actuating arm being abnormally engaged with the engaging lug, the lock/unlock lever is pivoted from the lock position to the unlock position, only the first sub-lever is permitted to move toward its unlock position against the force of the basing means keeping the abnormal engagement of the actuating arm with the engaging lug.

10 Claims, 10 Drawing Sheets

AUTOMOTIVE DOOR LOCK DEVICE

BACKGROUND OF THE INVENTION

1. Field of the Invention

The present invention relates in general to automotive door lock devices and more particularly to the automotive door lock devices of a type which includes an electric lock/unlock means controlled by a control switch arranged near a driver's seat.

2. Description of the Prior Art

In order to clarify the task of the present invention, one conventional automotive door lock device will be described with reference to FIGS. 17 to 19.

In these drawings, denoted by numeral 1 is a body of the door lock device, which is mounted to a door of a vehicle. Although not shown in the drawings, a latch plate and a stopper pawl are installed in the container part of the body 1. In fact, in FIG. 17, the container part is positioned at a back side of the sheet on which the drawing is illustrated. The latch plate is engageable with a striker fixed to the vehicle body. In fact, the latch plate has three positions, which are a full-latch position wherein the latch plate is fully or completely engaged with the striker, a half-latch position wherein the latch plate is halfly or incompletely engaged with the striker and a release position wherein the latch plate is disengaged from the striker. Due to function of a biasing means, the latch plate is constantly biased toward the release position. The stopper pawl has two positions, one being a stop position wherein the stopper pawl is engaged with the latch plate to retain the same at the full-latch or half-latch position, and the other being a release position wherein the stopper pawl is disengaged from the latch plate to release the same. Thus, when the stopper pawl takes the release position, the latch plate is permitted to take the release position due to aid of the biasing means. Under this condition, the door can be opened when applied with a certain force in a direction to open the door.

As is shown in FIG. 17, an open lever 2, a release lever 3, a first lock/unlock lever 4 and a second lock/unlock lever 5 are pivotally connected to the body 1. That is, the open lever 2 is secured to a shaft 102 of the stopper pawl thereby to pivot together with the stopper pawl. The release lever 3 is pivotally connected through a pivot shaft **3*b* to the body 1. A spring 3*c* is incorporated with the release lever 3 to bias the same to pivot in a counterclockwise direction in FIG. 17. The release lever 3 is connected through a connecting rod to an outside door handle ODH. Thus, when the outside door handle ODH is manipulated, the release lever 3 is pivoted in a clockwise direction in FIG. 17 against the force of the spring 3*c*. The first lock/unlock lever 4 is connected through a connecting rod to a door lock key-cylinder DLKC mounted on an outside part of the door near the outside door handle ODH. That is, when, with the door assuming a close position, the door lock key-cylinder DLKC is turned in a door locking direction by a key, the first lock/unlock lever 4 is pivoted in a counterclockwise direction for locking the door to the vehicle body, that is, in a direction to lock or retain the full-latching between the latch plate and the stopper pawl. The second lock/unlock lever 5 is connected to the first lock/unlock lever 4 having a predetermined play kept therebetween. A sub-lever 6 extends between the release lever 3 and the second lock/unlock lever 5**.

As is seen from FIG. 18, a base plate 7 is secured to the body 1. An inside lever 8 is pivotally connected through a pivot shaft **8*b* to the base plate 7, which is connected through a connecting rod to an inside door handle IDH and has an arm portion 8*a* contactable with an arm portion 3*a* of the release lever 3 (see FIG. 19). A knob lever 9 is pivotally connected through a pivot shaft 9*a* to the base plate 7, which is connected through a connecting lever 10 to the second lock/unlock lever 5. That is, pivoting movement of the knob lever 9 is transmitted to the second lock/unlock lever 5. Furthermore, the knob lever 9 is connected through a connecting rod 86 to a door lock knob 14** installed in an inside part of the door and through a connecting rod to an electric actuator ACT operated or controlled by a door lock/unlock switch SW arranged near a driver's seat. Sometimes, such door lock/unlock switch SW is mounted on a console box or an arm rest on the driver's door.

As is seen from FIG. 17, the first and second lock/unlock levers 4 and 5 are pivotally connected to the body 1 through a common pivot shaft 11. Upon manipulation of one of the door lock key-cylinder DLKC, the door lock knob 14 and the door lock/unlock switch SW, the second lock/unlock lever 5 can pivot about the pivot shaft 11 between a lock position as shown in FIG. 17 and an unlock position. Due to biasing force of a spring 12 (see FIG. 18) arranged between the base plate 7 and the knob lever 9, the second lock/unlock lever 5 is biased to pivot toward the lock or unlock position. That is, by the spring 12, the second lock/unlock lever 5 operates in a so-called snap action manner.

As shown in FIG. 17, an upper end of the sub-lever 6 is pivotally connected to the release lever 3, and a lower end of the sub-lever 6 is formed with an arcuate slot **6*a* with which an arm portion 5*a* of the second lock/unlock lever 5 is slidably engaged. 5The sub-lever 6 is formed with an actuating arm 6*b***.

As is seen from FIG. 17, when the second lock/unlock lever 5 assumes the lock position, the actuating arm **6*b* takes a lock position wherein the actuating arm 6*b* is not engageable with an engaging lug 2*a* of the open lever 2, while, when the second lock/unlock lever 5 pivots clockwise to the unlock position, the actuating arm 6*b* is shifted rightward to an unlock position wherein the actuating arm 6*b* is engageable with the engaging lug 2*a* of the open lever 2**.

When, with the second lock/unlock lever 5 assuming the unlock position, the outside or inside door handle ODH or IDH is manipulated, the release lever 3 is pivoted in a clockwise direction moving the sub-lever 6 downward and thus the actuating arm **6*b* of the sub-lever 6 abuts against the engaging lug 2*a* of the open lever 2 thereby pivoting the open lever 2 in a clockwise direction. With this, the stopper pawl integral with the open lever 6** is pivoted to the release position to disengage the latch plate causing the latter to release the striker. Under this condition, the door can be opened.

While, when, with the second lock/unlock lever 5 assuming the lock position as shown in FIG. 17, the outside or inside door handle ODH or IDH is manipulated and thus the release lever 3 is pivoted in a clockwise direction to move the sub-lever 6 downward, the actuating arm **6*b* of the sub-lever 6 fails to abut against the engaging lug 2*a* of the open lever 2**. Thus, in this case, the fully latched engagement between the latch plate and the stopper pawl is not cancelled and thus the door can not be opened. That is, the locked condition of the door is kept.

When the door lock/unlock switch SW is manipulated, the electric actuator ACT is operated to pivot the second lock/unlock lever 5 in a direction to lock or unlock the door lock device, that is, in a direction to pivot the sub-lever 6 in the above-mentioned locking or unlocking direction.

However, due to its inherent construction, the above-mentioned conventional automotive door lock device has the following drawback.

That is, when, with the door kept locked to the vehicle body, the driver manipulates the door lock/unlock switch SW in a direction to unlock the door just after a passenger handles the outside or inside door handle ODH or IDH for the purpose of opening the door, it occurs that the pivoting movement of the sub-lever 6 toward the lock canceling direction is obstructed. That is, as is seen from FIG. 19, when the above-mentioned two manipulations take place at substantially the same time, one side edge 6*c* of the actuating arm 6*b* of the sub-lever 6 becomes engaged with a side portion of the engaging lug 2*a* of the open lever 2, preventing the rightward movement of the sub-lever 6 toward the unlock or lock canceling position. This means that the door can not be unlocked even though the driver has manipulated the door lock/unlock switch SW in the direction to unlock the door, and thus, the passenger can not open the door. In this case, for unlocking and opening the door, the driver must manipulates the door lock/unlock switch SW again while asking the passenger to release his or her hand from the outside or inside door handle ODH or IDH.

SUMMARY OF THE INVENTION

It is therefore an object of the present invention to provide an automotive door lock device which is free of the above-mentioned drawback.

According to the present invention, there is provided an automotive door lock device which has such an operative operation that when, with the door being kept locked, a door unlocking manipulation of a door lock/unlock switch is carried out just after a door opening manipulation of an outside or inside door handle thereby to induce a jammed condition of the door lock, the door can be unlocked by carrying out the door opening manipulation of the outside or inside door handle again without repeating the door unlocking manipulation of the door lock/unlock switch.

According to the present invention, there is further provided an automotive door lock device which, in addition to the above-mentioned advantageous operation, has another advantageous operation that the locked condition of the door can be cancelled by carrying out the manipulation of the inside door handle twice.

According to the present invention, there is provided an automotive door lock device which comprises an open lever pivotal between a door latch position and a door unlatch position, the open lever having an engaging lug; a lock/unlock lever pivotal between lock and unlock positions; a release lever pivotal between first and second positions; a first sub-lever having one end pivotally connected to the release lever and the other end pivotally connected to the lock/unlock lever; a second sub-lever having one end pivotally connected to the first sub-lever and the other end formed with an actuating arm, the actuating arm being engageable with the engaging lug of the open lever; and biasing means for biasing the second sub-lever toward the first sub-lever, wherein when the lock/unlock lever assumes the unlock position, the pivoting of the release lever from the first position to the second position induces an abutment of the actuating arm with the engaging lug of the open lever thereby to pivot the stopper pawl toward the door unlatch position, and when the lock/unlock lever assumes the lock position, the pivoting of the release lever from the first position to the second position fails to induce such engagement, and wherein when, with the actuating arm being abnormally engaged with the engaging lug, the lock/unlock lever is pivoted from the lock position to the unlock position, only the first sub-lever is permitted to move toward its unlock position against the force of the basing means keeping the abnormal engagement of the actuating arm with the engaging lug.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Referring to FIGS. 1 to 5, there is shown an automotive door lock device 100A which is a first embodiment of the present invention.

For ease of description, detailed explanation on parts which are substantially same as those of the above-mentioned conventional door lock device will be omitted, and such parts are denoted by the same numerals.

That is, in this first embodiment 100A, a first sub-lever 61, a second sub-lever 62 and a spring 64 are employed in place of the sub-lever (6) employed in the conventional lock device.

Figure 1:
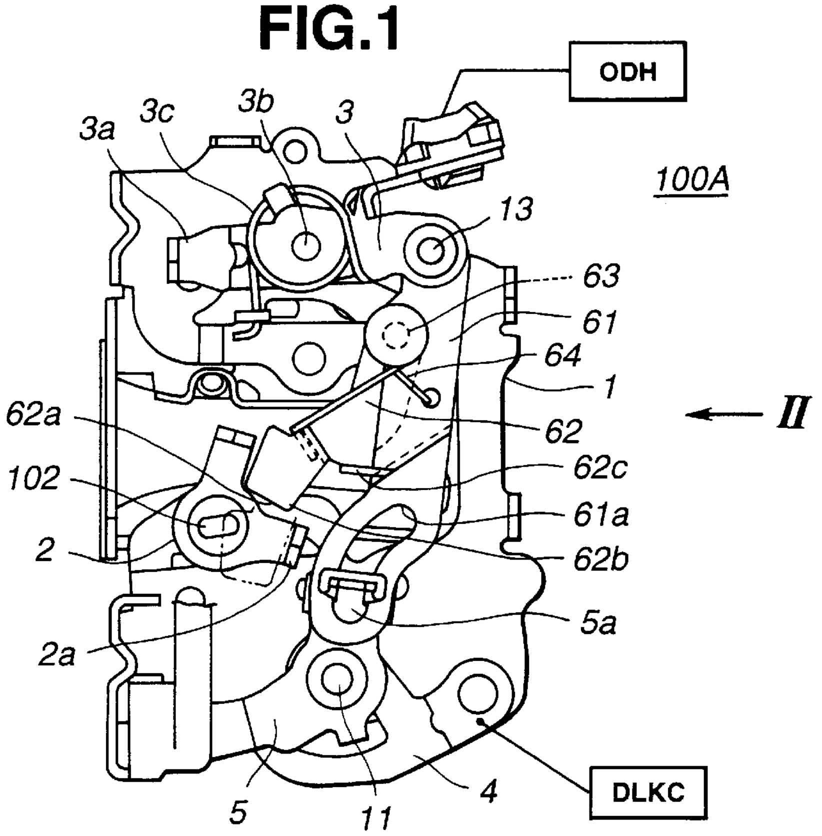
FIG. 1 is a front view of an automotive door lock device which is a first embodiment of the present invention.

As is best seen from FIG. 1, the first sub-lever 61 has an upper end pivotally connected through a pivot shaft 13 to a release lever 3. The first sub-lever 61 has at a lower portion an arcuate slot 61*a* with which an arm portion 5*a* of a second lock/unlock lever 5 is slidably engaged.

The second sub-lever 62 has an upper end pivotally connected through a pivot shaft 63 to the first sub-lever 61. A lower end of the second sub-lever 62 is formed with an actuating arm 62*a* which is engageable with an engaging lug 2*a* of an open lever 2. As has been described in the part of the conventional lock device, the open lever 2 is integrally connected to a stopper pawl which can retain and release a latch plate.

The actuating arm 62*a* of the second sub-lever 62 is formed with a right side edge 62*b* which is engageable with a left side surface of the engaging lug 2*a* of the open lever 2. The second sub-lever 62 further has near the right side edge 62*b* a raised stopper 62*c* which is contactable with a left edge of the first sub-lever 61 to restrict a counterclockwise pivoting of the second sub-lever 62.

Disposed about the pivot shaft 63 is the coil spring 64 which has one end hooked to the first sub-lever 61 and the other end hooked to the second sub-lever 62. With this spring 64, the second sub-lever 62 is biased to pivot in a counterclockwise direction in FIG. 1, that is, in a direction to press the raised stopper 62*c* against the first sub-lever 61.

Usually, due to the force of the coil spring 64, the raised stopper 62*c* is kept in abutment with the first sub-lever 61 causing the second sub-lever 62 to take a normally set position relative to the first sub-lever 61. It is to be noted that the biasing force of the coil spring 64 applied to the first and second sub-levers 61 and 62 is set smaller than the biasing force of a spring 12 (see FIG. 2) applied to a knob lever 9 connected to the second lock/unlock lever 5. As is seen from FIG. 2, the knob lever 9 is linked through the connecting rod 86 to the lock knob 14 mounted on an inside portion of the door. A connecting rod from an electric actuator ACT mounted in the door is connected to the knob lever 9. The electric actuator ACT is controlled by a door lock/unlock switch SW arranged near the driver's seat.

In the following, operation of the automotive door lock device 100A of the first embodiment will be described with reference to the drawings.

Figure 5:
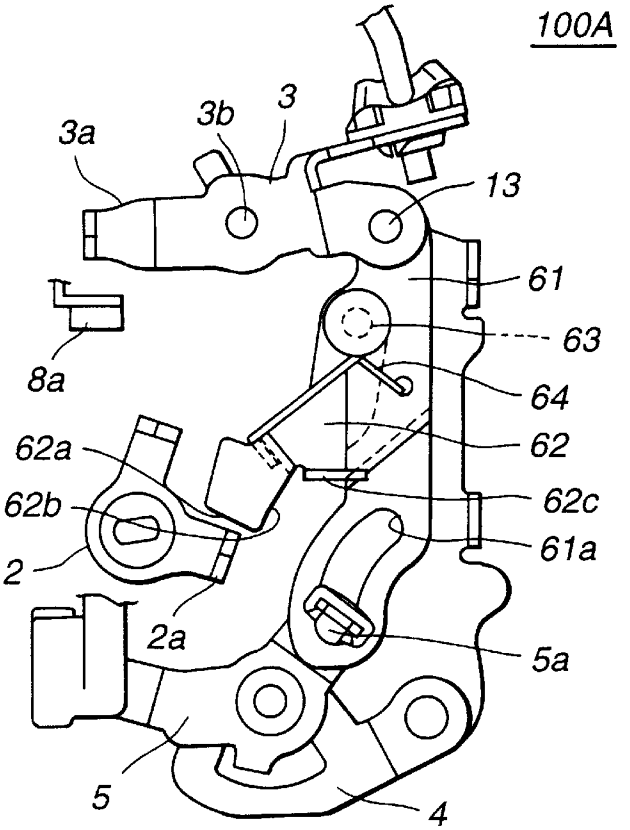
FIG. 5 is a view similar to FIG. 4, but showing a condition wherein the lock device assumes an unlock condition.
Figure 6:
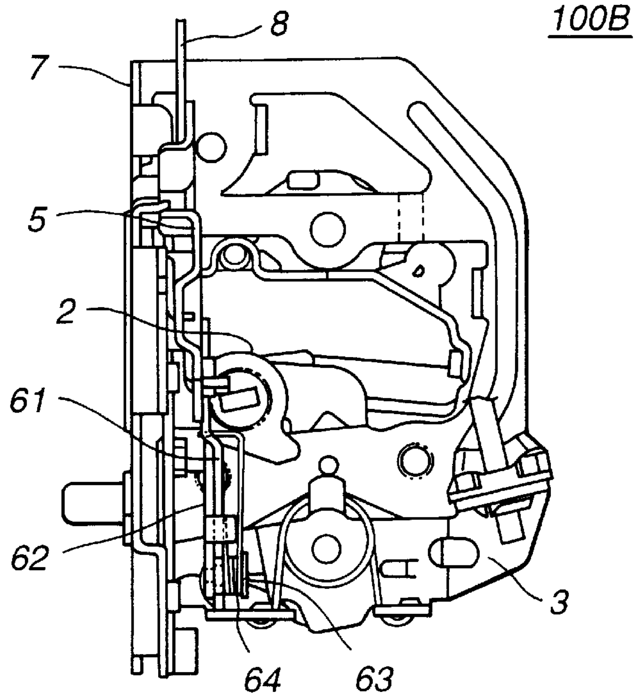
FIG. 6 is a front view of an automotive door lock device which is a second embodiment of the present invention, showing a lock condition of the lock device.

For ease of understanding, the description will be commenced with respect to a condition wherein the stopper pawl retains the latch plate at the full-latch position and as is seen from FIG. 5, the second lock/unlock lever 5 assumes the unlock position.

When, due to manipulation of the outside or inside door handle ODH or IDH, the release lever 3 is pivoted in a clockwise direction in FIG. 5, a unit consisting of the first sub-lever 61 and the second sub-lever 62 is moved downward. Upon this, the actuating arm 62*a* of the second sub-lever 62, which has been kept in the normally set position relative to the first sub-lever 61, is brought into abutment with the engaging lug 2*a* of the open lever 2 thereby to pivot the open lever 2 in a direction to cause the stopper pawl to release the latch plate. Thus, the full-latch condition of the latch plate becomes cancelled and thus the door can be opened.

When, with the second lock/unlock lever 5 assuming the lock position as shown in FIG. 1, the release lever 3 is pivoted in the same or clockwise direction due to manipulation of the outside or inside door handle ODH or IDH, the unit consisting of the first and second sub-levers 61 and 62 is forced to move downward. However, in this case, the downward movement of the unit fails to cause the actuating arm 62*a* of the second sub-lever 62 to abut against the engaging lug 2*a* of the open lever 2. That is, the actuating arm 62*a* does no action against the open lever 2 as is seen from the position illustrated by a broken line. Thus, in this case, the full-latch condition of the latch plate is not cancelled and thus the door can not be opened. In other words, the locked condition of the door is maintained.

That is, when the second lock/unlock lever 5 assumes the lock position as shown in FIG. 1, the downward movement of the first sub-lever 61 (and also the second sub-lever 62) caused by the manipulation of the outside or inside door handle ODH or IDH by a passenger brings about an inoperative movement of the actuating arm 62*a* of the second sub-lever 62 to the position shown by the broken line.

When, now, under this condition, the door lock/unlock switch SW positioned near the driver's seat is manipulated in a direction to unlock the door, the electric actuator ACT actuates the knob lever 9 (see FIG. 2) in a direction to pivot the second lock/unlock lever 5 clockwise toward the unlock position. As is seen from FIG. 4, due to this clockwise pivoting of the second lock/unlock lever 5, only the first sub-lever 61 is permitted to move rightward toward the unlock position against the force of the spring 64 because the rightward movement of the second sub-lever 62 is suppressed by the abnormal engagement between the right side edge 62*b* of the actuating arm 62*a* and the engaging lug 2*a* of the open lever 2. That is, due to the pivoting connection between the first and second sub-levers 61 and 62, the rightward movement of the first sub-lever 61 to its unlock position is permitted upon manipulation of the door lock/unlock switch SW in the door unlocking direction even when the second sub-lever 62 has been kept abnormally engaged with the engaging lug 2*a* of the open lever 2.

When thereafter the outside or inside door handle ODH or IDH is released from the passenger's hand, the first and second sub-levers 61 and 62 are moved up to their original upper positions wherein the right side edge 62*b* of the actuating arm 62*a* disengages from the engaging lug 2*a* of the open lever 2 causing the second sub-lever 62 to return to its unlock position due to force of the spring 64. That is, the second sub-lever 62 takes the normally set position relative to the first sub-lever 61, as shown in FIG. 5.

Thus, when thereafter the outside or inside door handle ODH or IDH is manipulated again, the actuating arm 62*a* of the second sub-lever 62 can abut against and push down the engaging lug 2*a* of the open lever 2. Thus, the full-latch condition of the latch plate retained by the stopper pawl is cancelled and thus the door can be opened.

Referring to FIGS. 6 to 9, there is shown an automotive door lock device 100B which is a second embodiment of the present invention.

The lock device 100B of the second embodiment is substantially the same as that of the above-mentioned first embodiment 100A except the shapes of some levers employed therein. Substantially same parts as those of the first embodiment 100A are denoted by the same numerals.

Figure 2:
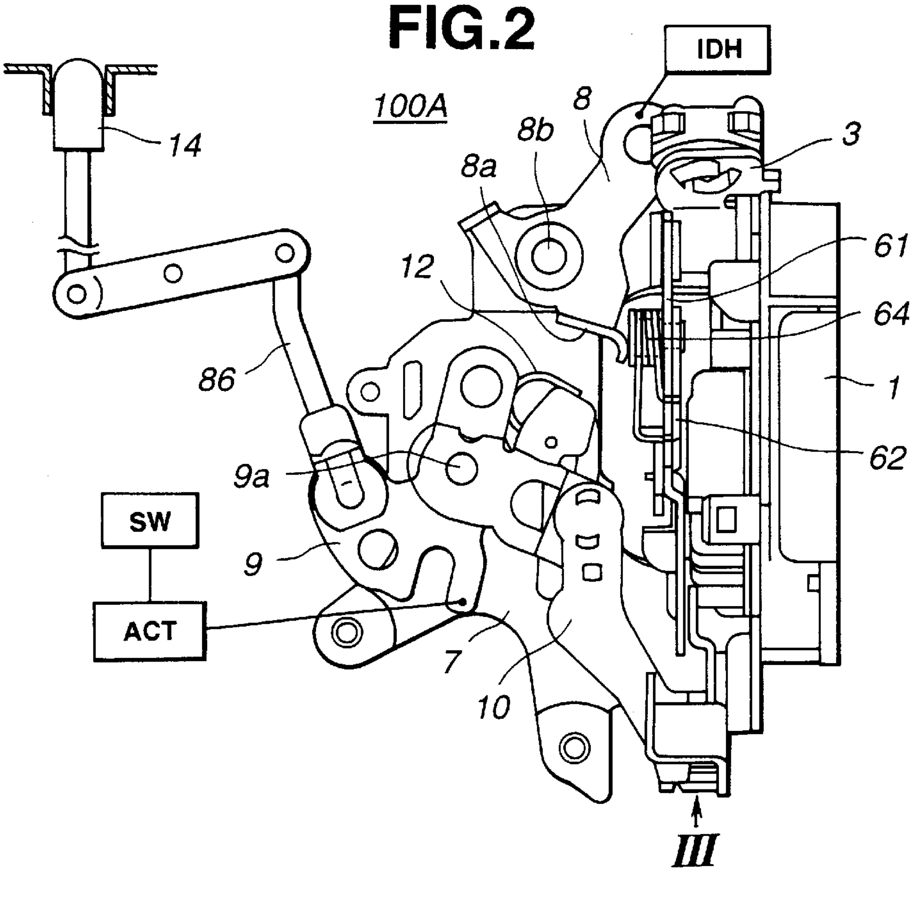
FIG. 2 is a view taken from the direction of the arrow "II" of FIG. 1.
Figure 3:
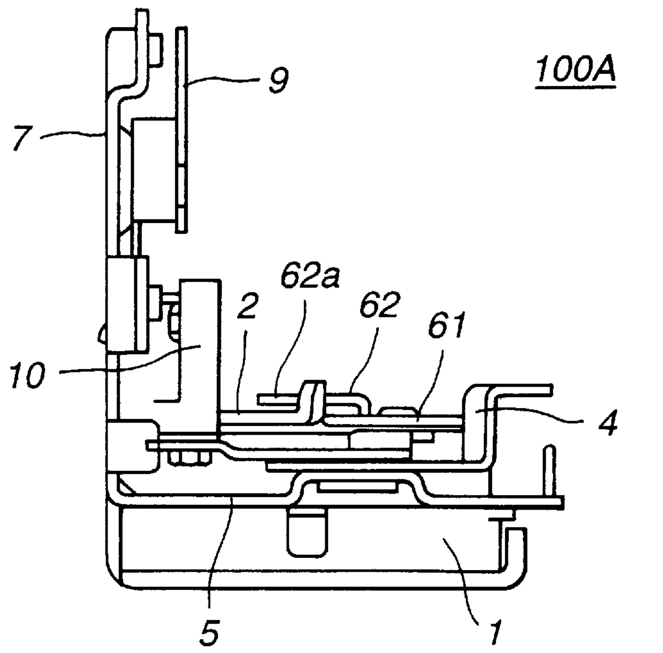
FIG. 3 view taken from the direction of the arrow "III" of FIG. 2.
Figure 4:
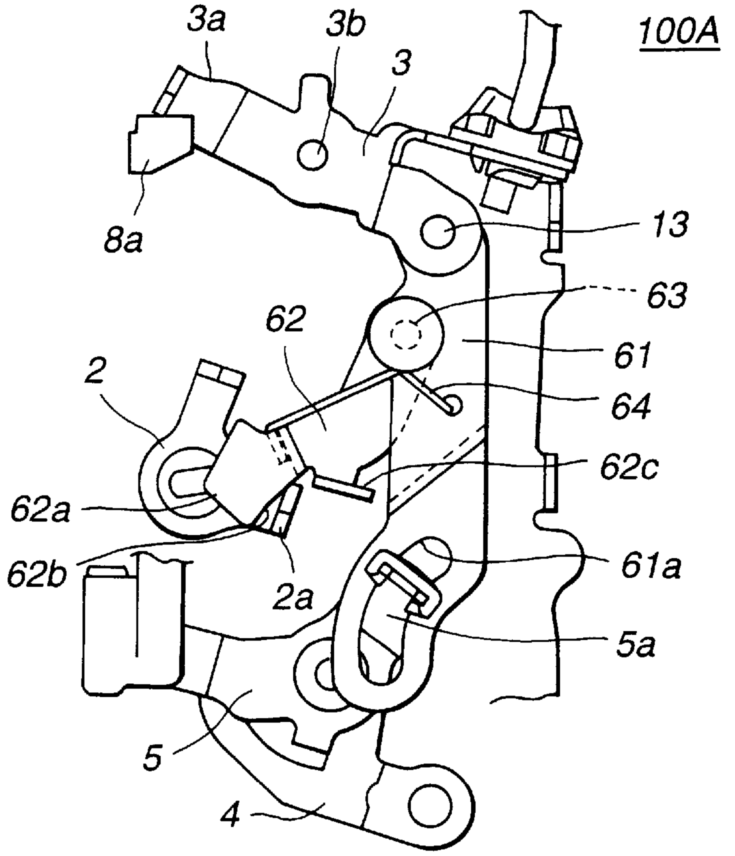
FIG. 4 is a front view of essential parts of the lock device of the first embodiment under a condition wherein due to pivoting of a release lever, a second sub-lever is pivoted away from a first sub-lever.
Figure 7:
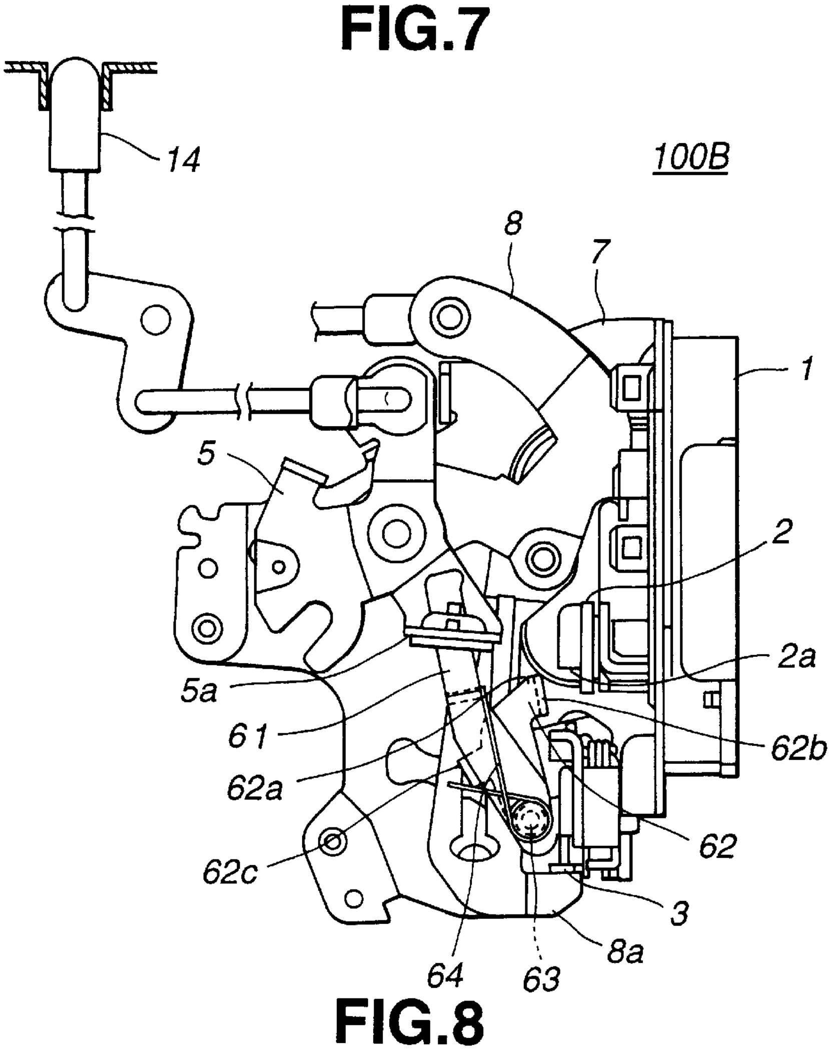
FIG. 7 is a side view of the lock device of the second embodiment.

As will be understood when comparing FIG. 2 (first embodiment 100A) and FIG. 7 (second embodiment 100B), in the second embodiment 100B, a unit consisting of the first and second sub-levers 61 and 62 is arranged to move over an imaginary plane which is perpendicular to a pivot axis (viz., the shaft 102) of the open lever 2. More specifically, during upward movement of the unit over the imaginary plane, the actuating arm 62*a* of the second sub-lever 62 can push up the engaging lug 2*a* of the open lever 2. Furthermore, in the second embodiment 100B, the first and second sub-levers (4) and (5) and the knob lever (9) which are employed in the first embodiment 100A are united as a single lock/unlock lever 5. The arm portion 8*a* is pivotally connected to the inside lever 8, which is contactable with the arm portion 3*a* of the release lever 3.

Like in the first embodiment 100A, due to the biasing force of the coil spring 64, the second sub-lever 62 is biased to take a normally set position relative to the first sub-lever 61. The first sub-lever 61 is connected to the lock/unlock lever 5 in substantially same manner as the connection between the first sub-lever (61) and the second lock/unlock lever (5) in the first embodiment 100A. The release lever 3 is pivotally connected to a lower end of the first sub-lever 61.

Operation of the second embodiment 100B will be described in the following.

When, due to manipulation of the outside or inside door handle ODH or IDH, the release lever 3 is pivoted, the first sub-lever 61 and the second sub-lever 62 are moved upward. Upon this, the actuating arm 62*a* of the second sub-lever 62, which has been kept in the normally set position relative to the first sub-lever 61, is brought into abutment with the engaging lug 2*a* of the open lever 2 thereby to pivot the open lever 2 in a direction to cancel the full-latch condition of the latch plate retained by the stopper pawl. Thus, the door can be opened.

While, when, with the lock/unlock lever 5 assuming its lock position as shown in FIG. 7, the outside or inside door handle ODH or IDH is manipulated, the release lever 3 is pivoted in a direction to bring about an inoperative upward movement of the first and second sub-levers 61 and 62. Of course, in this case, the locked condition of the door is not cancelled.

When, under this condition, the door lock/unlock switch SW near the driver's seat is manipulated in a direction to unlock the door, the actuator ACT actuates the lock/unlock lever 5 to pivot toward its unlock position. As is seen from FIG. 9, due to the pivoting of the unlock/lock lever 5 to the unlock position, only the first sub-lever 61 is permitted to move upward toward its unlock position against the force of the spring 64 because the upward movement of the second sub-lever 62 is suppressed by the engagement of between the edge 62*b* of the actuating arm 62*a* and the engaging lug 2*a* of the open lever 2. That is, during the upward movement of the first sub-lever 61, the second sub-lever 62 is pivoted away from the first sub-lever 61 against the force of the spring 64.

Figure 8:
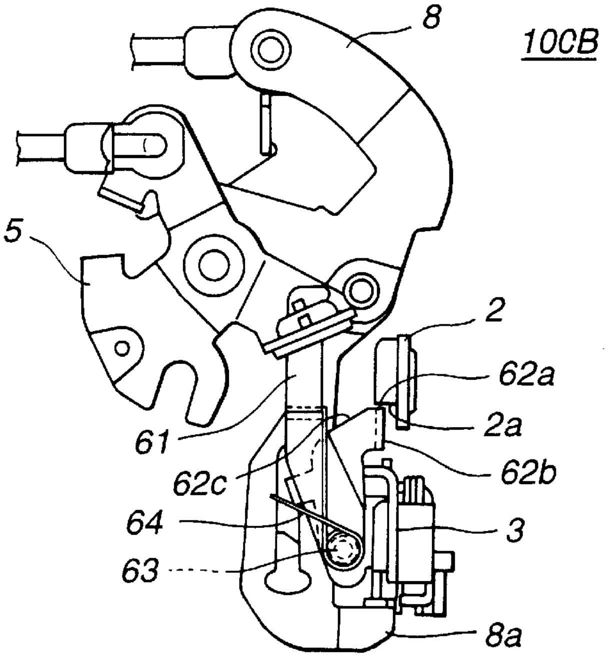
FIG. 8 is a side view of essential parts of the lock device of the second embodiment under an unlock condition of the lock device.
Figure 9:
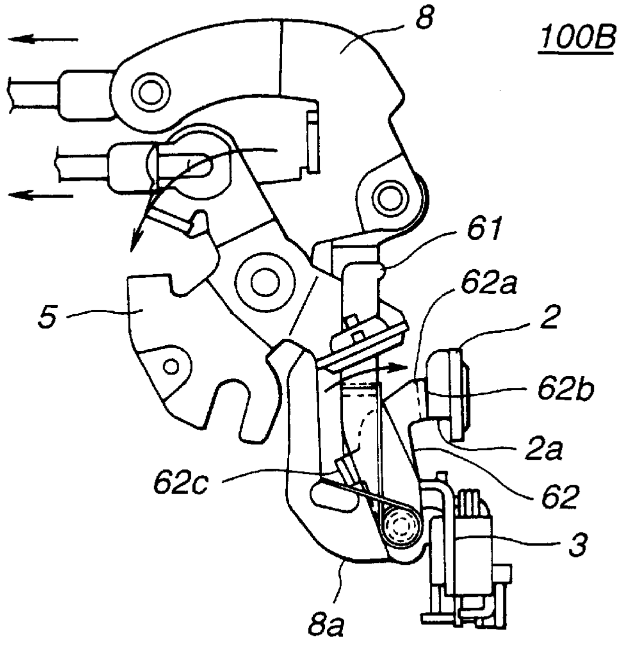
FIG. 9 is a view similar to FIG. 8, but showing a condition wherein due to pivoting of a release lever, a second sub-lever is pivoted away from a first sub-lever.

When thereafter the outside or inside door handle ODH or IDH is released from the passenger's hand, the first and second sub-levers 61 and 62 are moved down to their original lower positions wherein the edge 62*b* of the actuating arm 62*a* disengages from the engaging lug 2*a* of the open lever 2 causing the second sub-lever 62 to pivot to its unlock position due to force of the spring 64. That is, the second sub-lever 62 takes the normally set position relative to the first sub-lever 61 as shown in FIG. 8.

Thus, when thereafter the outside or inside handle ODH or IDH is manipulated again, the actuating arm 62*a* of the second sub-lever 62 can abut against and push up the engaging lug 2*a* of the open lever 2. With this, the stopper pawl releases the latch plate and thus the door can be opened.

Referring to FIGS. 10 to 13, there is shown an automotive door lock device 100C which is a third embodiment of the present invention. As will become apparent as the description proceeds, in addition to the above-mentioned advantageous operation possessed by the first and second embodiments 100A and 100B, the door lock device 100C of the third embodiment has another advantageous operation. That is, when the door is kept locked, double manipulation of the inside door handle IDH can bring about unlocked condition of the door.

The door lock device 100C of this third embodiment is similar to the door lock device 100A of the above-mentioned first embodiment. Thus, substantially same parts as those of the first embodiment 100A are denoted by the same numerals and detailed explanation of them will be omitted from the following description.

Figure 10:
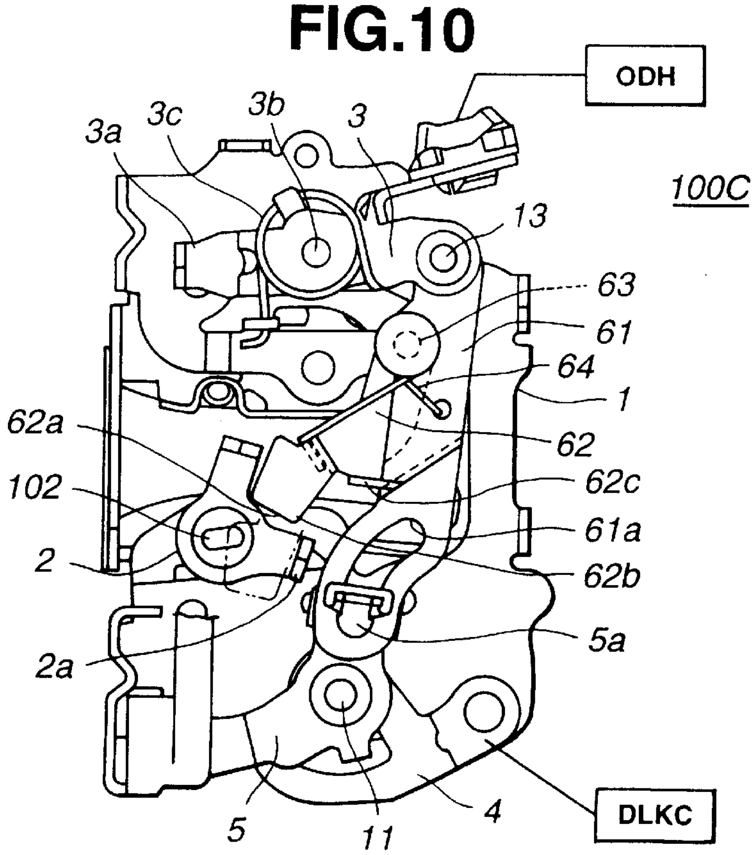
FIG. 10 is a view similar to FIG. 1, but showing an automotive door lock device of a third embodiment of the present invention.
Figure 13:
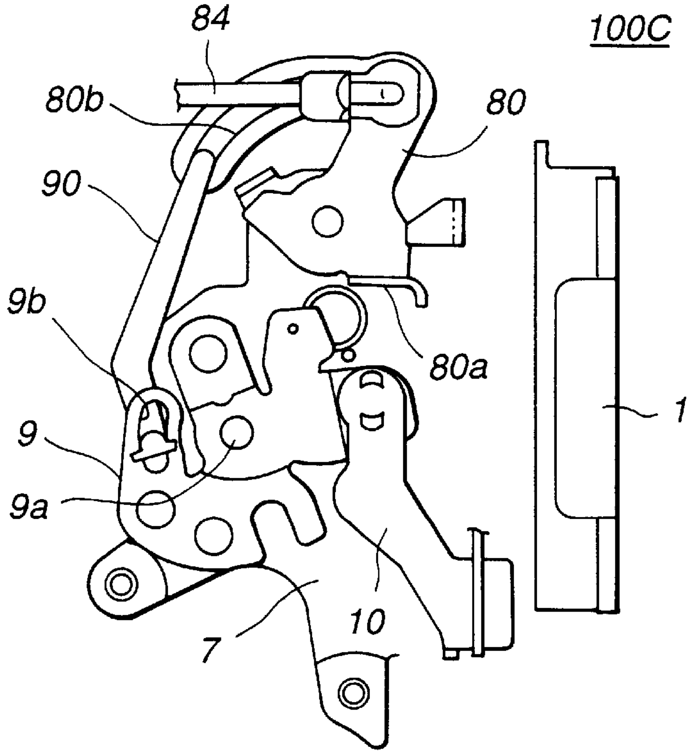
FIG. 13 is a view similar to FIG. 12, but showing a condition taken when the lock device assumes an unlock condition.

As is seen from FIG. 10, the release lever 3 is pivotally connected to the body 1 through the pivot shaft 3*b*. When the outside door handle ODH is manipulated, the release lever 3 is pivoted in a clockwise direction against the force of the spring 3*c*. The first and second lock/unlock levers 4 and 5 are connected to the body 1 trough the common shaft 11. The first lock/unlock lever 4 is connected to the door lock key-cylinder DLKC mounted on the outside part of the door. That is, when the door lock key-cylinder DLKC is manipulated by a key, the second lock/unlock lever 5 can pivot between a lock position as shown in FIG. 10 and an unlock position (see FIG. 5). In response to the pivoting movement of the second lock/unlock lever 5, the knob lever 9 can pivot between a lock position as shown in FIG. 11 and an unlock position as shown in FIG. 13.

Figure 11:
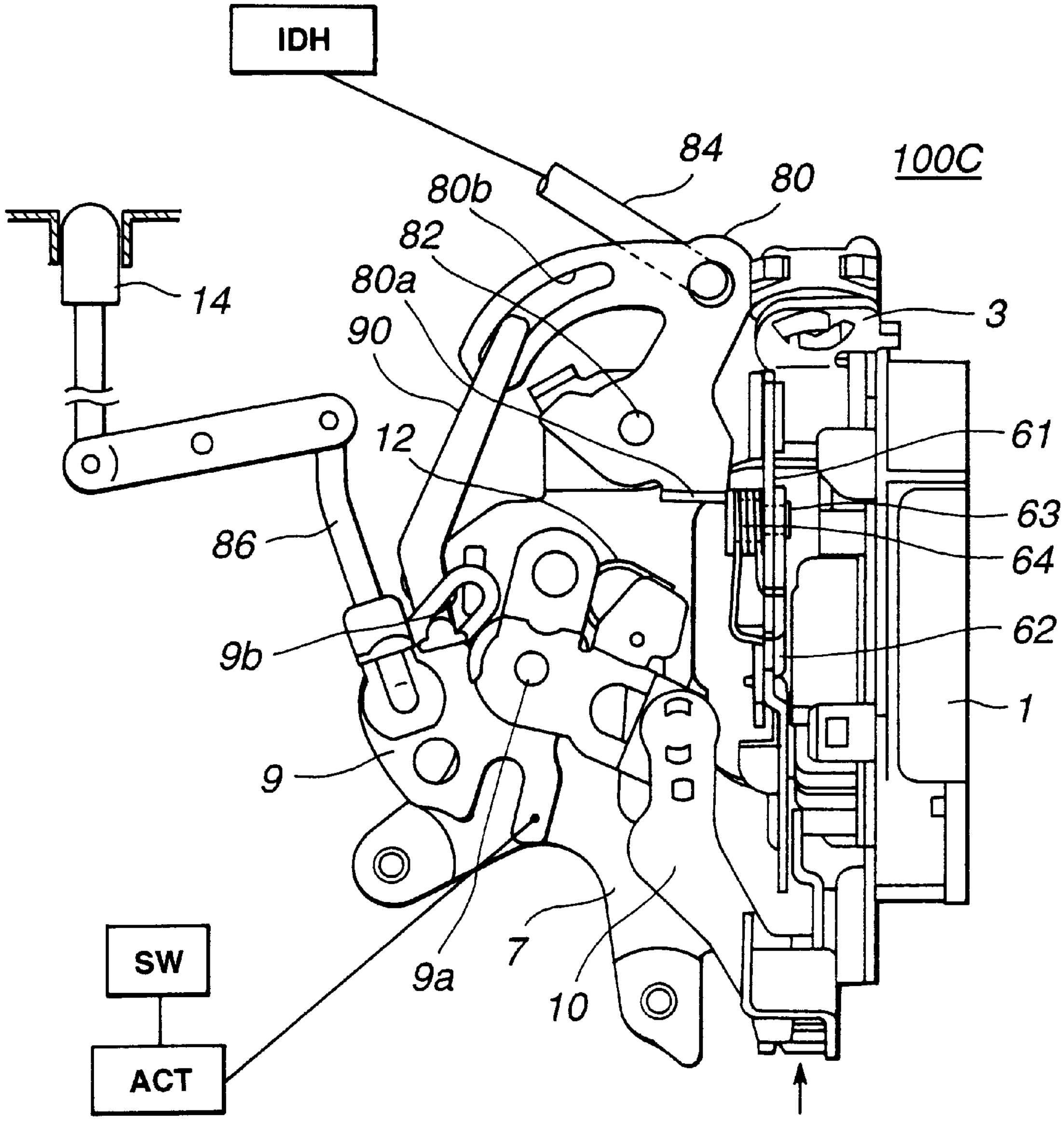
FIG. 11 is a view similar to FIG. 2, but showing the third embodiment of the present invention.
Figure 12:
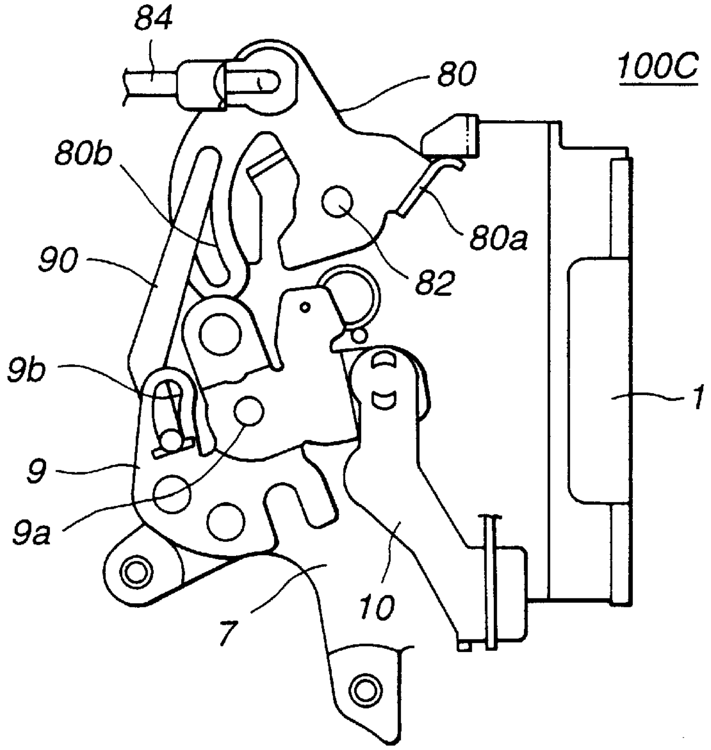
FIG. 12 is a side view of essential parts of the lock device of the third embodiment, showing a condition taken when, with the lock device assuming a lock condition, an inside door handle is manipulated.

When the second lock/unlock lever 5 and the knob lever 9 are in their lock positions, the door lock knob 14 is entirely retracted in the door as shown in FIG. 11, while, when these levers 5 and 9 are in their unlock positions, the door lock knob 14 is projected upward from the door. When the projected door lock knob 14 is pushed down, door lock operation is effected in the door lock device 100C.

Due to provision of the spring 12, the second lock/unlock lever 5 and the knob lever 9 are each pivoted to the lock position or unlock position in a snap action manner. Usually, the first lock/unlock lever 4 assumes a neutral position as shown in FIG. 10. That is, when the door lock key-cylinder is turned in the door lock canceling direction, the first lock/unlock lever 4 is pivoted in a clockwise direction in FIG. 10, and when the door lock key-cylinder DLKC is turned in the door locking direction, the lever 4 is pivoted in a counterclockwise direction.

As is seen from FIG. 10, in response to a clockwise (or releasing) pivoting of the release lever 3, the unit consisting of the first and second sub-levers 61 and 62 is moved downward. As has been described in the part of the first embodiment 100A, the second sub-lever 62 can take two angular positions depending on the position of the second lock/unlock lever 5, one being a lock position as shown in FIG. 10 causing the actuating arm 62*a* to fail to actuate the open lever 2, and the other being an unlock position (see FIG. 5) causing the actuating arm 62*a* to pivot the open lever 2 and thus pivot the stopper pawl in a so-called latch plate releasing direction.

As is seen from FIG. 11, the shape of the inside lever 80 used in the third embodiment 100C is different from that of the first embodiment 100A. The inside lever 80 is pivotally connected to the base plate 7 of the body 1 through a pivot shaft 82. The inside lever 80 is formed with an arm portion 80*a* which is contactable with the arm portion 3*a* of the release lever 3. Designated by numeral 84 is a connecting rod which extends from the inside lever 80 to the inside door handle IDH. That is, upon manipulation of the inside door handle IDH, the inside lever 80 is pivoted in a counterclockwise direction in FIG. 11, so that the arm portion 80*a* is brought into abutment with the arm portion 3*a* of the release lever 3 to pivot the release lever 3 in the releasing direction.

The inside lever 80 and the knob lever 9 are loosely connected through a connecting bar 90. The inside lever 80 is formed with an arcuate slot 80*b* which is concentric with the pivot shaft 82, and the knob lever 9 is formed with an arcuate slot 9*b* which is concentric with the pivot shaft 9*a*. The connecting bar 90 has one bent end slidably engaged with the arcuate slot 80*b* of the inside lever 80 and the other bent end slidably engaged with the arcuate slot 9*b* of the knob lever 9.

The connection of the connecting bar 90 to both the arcuate slots 80*b* and the 9*b* is so made that the pivoting of the inside lever 80 in the releasing direction induces a pivoting of the knob lever 9 from the lock position to the unlock position. The pivoting of the knob lever 9 in the locking or unlocking direction has no effect on the inside lever 80. If desired, with usage of a play means, the inside lever 10 may be directly connected to the second lock/unlock lever 5 without usage of the knob lever 9 and the connecting lever 10.

In the following, operation of the automotive door lock device 100C of the third embodiment will be described.

For ease of understanding, the description will be commenced with respect to a condition wherein the stopper pawl retains the latch plate at the full-latch position, the door lock knob 14 is kept projected from the door and the knob lever 9 assumes the unlock position.

When now, due to manipulation of the outside or inside door handle ODH or IDH, the release lever 3 is pivoted in a direction to move the first and second sub-levers 61 and 62 downward, the actuating arm 62*a* of the second sub-lever 62, which has been kept in the normally set position relative to the first sub-lever, is brought into abutment with the engaging lug 2*a* of the open lever 2. Thus, the open lever 2 is turned in a is direction to release the stopper pawl from the latch plate. Thus, the door can be opened.

Under a locked condition of the door, the door lock knob 14 is fully received in the door as shown in FIG. 11, the knob lever 9 assumes the lock position as shown in FIG. 11 and the second lock/unlock lever 5 assumes the lock position as shown in FIG. 10.

When now the outside door handle ODH is manipulated, the release lever 3 is pivoted in a direction to move the first and second sub-levers 61 and 62 downward. However, in this case, the actuating arm 62*a* of the second sub-lever 62 fails to abut against the engaging lug 2*a* of the open lever 2 for the reason as has been mentioned hereinabove. Thus, the full-latch condition of the latch plate is not cancelled and thus the door can not be opened. That is, the locked condition of the door is kept.

While, when, with the door being locked, the inside door handle IDH is manipulated twice, the full-latch condition of the latch plate can be cancelled and thus the door can be opened.

That is, in response to a first manipulation of the inside door handle IDH, the inside lever 80 and the connecting bar 90 function to pivot the knob lever 9 from the lock position to the unlock position. In response to this pivoting, the second lock/unlock lever 5 and the first sub-lever 61 are pivoted toward their unlock positions through the connecting lever 10. Thus, the downward movement of the first sub-lever 61 and the second sub-lever 62 induced by the first manipulation of the inside door handle IDH brings about an inoperative movement of the actuating arm 62*a* of the second sub-lever 62. That is, only the first sub-lever 61 is permitted to move toward its unlock position against the force of the spring 64 because the movement of the second sub-lever 62 is suppressed by the engagement between the right side edge 62*b* of the actuating arm 62*a* and the engaging lug 2*a* of the open lever 2. This condition will be understood from FIG. 4. During the movement of the first sub-lever 61 to its unlock position, the second sub-lever 62 is pivoted away from the first sub-lever 61 against the force of the spring 64.

When thereafter the inside door handle IDH is released from the passenger's hand, the first and second sub-levers 61 and 62 are moved up to their original upper positions wherein the right side edge 62*b* of the actuating arm 62*a* disengages from the engaging lug 2*a* of the open lever 2 causing the second sub-lever 62 to pivot to its unlock position due to force of the spring 64. That is, the second sub-lever 62 takes the normally set position relative to the first sub-lever 61 (as will be understood from FIG. 5).

When now, a second manipulation of the inside door handle IDH is made, the actuating arm 62*a* of the second sub-lever 62 can abut against and push down the engaging lug 2*a* of the open lever 2. With this, the full-latch condition of the latch plate is cancelled and thus the door can be opened.

When, with the first lock/unlock lever 5 assuming the lock position as shown in FIG. 10, a driver manipulates the door lock/unlock switch SW in a direction to unlock the door just after a passenger handles the outside or inside door handle ODH or IDH for the purpose of opening the door, only the first sub-lever 61 is permitted to move toward its unlock position against the force of the spring 64 because the movement of the second sub-lever 62 is suppressed by the engagement between the right side edge 62*b* of the actuating arm 62*a* and the engaging lug 2*a* of the open lever 2. That is, during the movement of the first sub-lever 61 to its unlock position, the second sub-lever 62 is pivoted away from the first sub-lever 61 against the force of the spring 64.

When thereafter the outside or inside door handle ODH or IDH is released from the passenger's hand, the first and second sub-levers 61 and 62 are moved up to their original upper positions wherein due to the force of the spring 64, the second sub-lever 62 is forced to assume the normally set position relative to the first sub-lever 61.

When then the outside or inside door handle ODH and IDH is manipulated by the passenger again, the downward movement of the second sub-lever 62 together with the first sub-lever 61 permits the actuating arm 62*a* to abut against and push down the engaging lug 2*a* of the open lever 2. Thus, the door can be opened.

Figure 14:
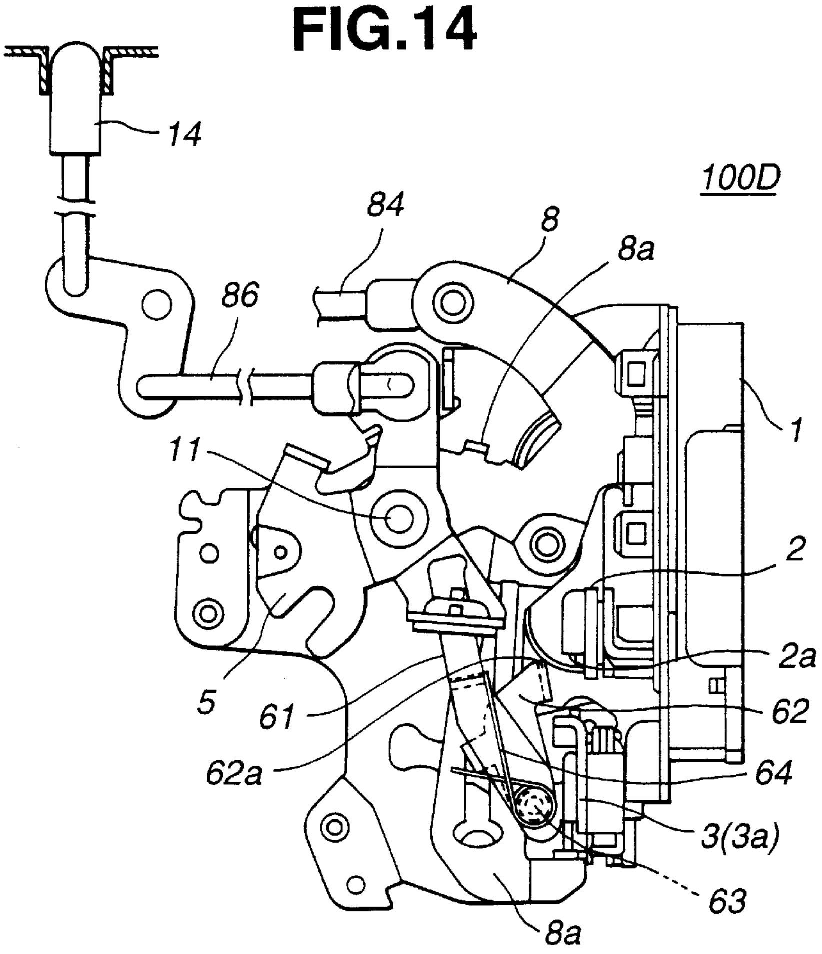
FIG. 14 is a view similar to FIG. 2, but showing an automotive door lock device of a fourth embodiment of the present invention.
Figure 15:
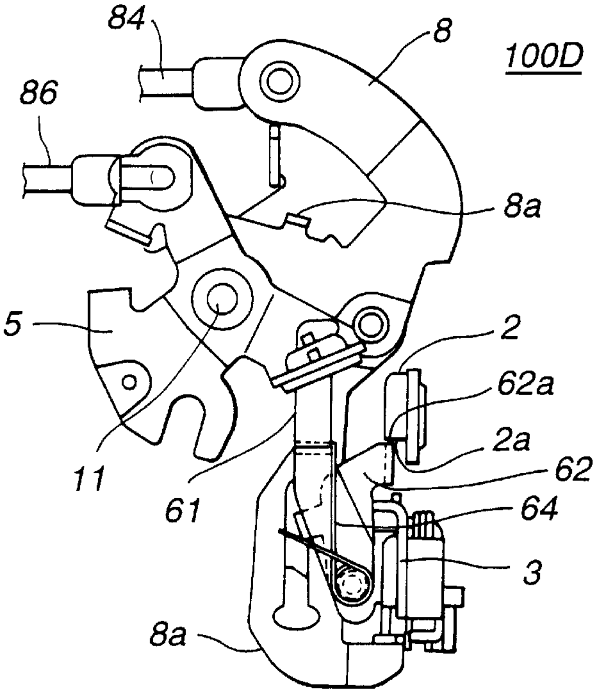
FIG. 15 is a side view of essential parts of the lock device of the fourth embodiment, showing a condition taken when the lock device assumes an unlock condition.
Figure 16:
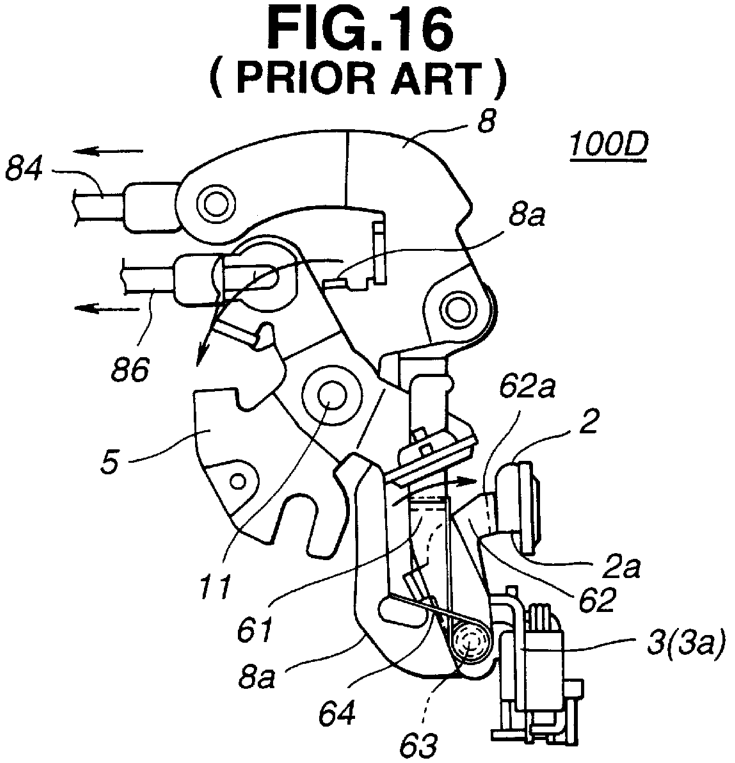
FIG.16 (PRIOR ART)
FIG. 16 is a view similar to FIG. 15, but showing a condition taken when, with the lock device assuming a lock condition, an inside door handle is manipulated.
Figure 17:
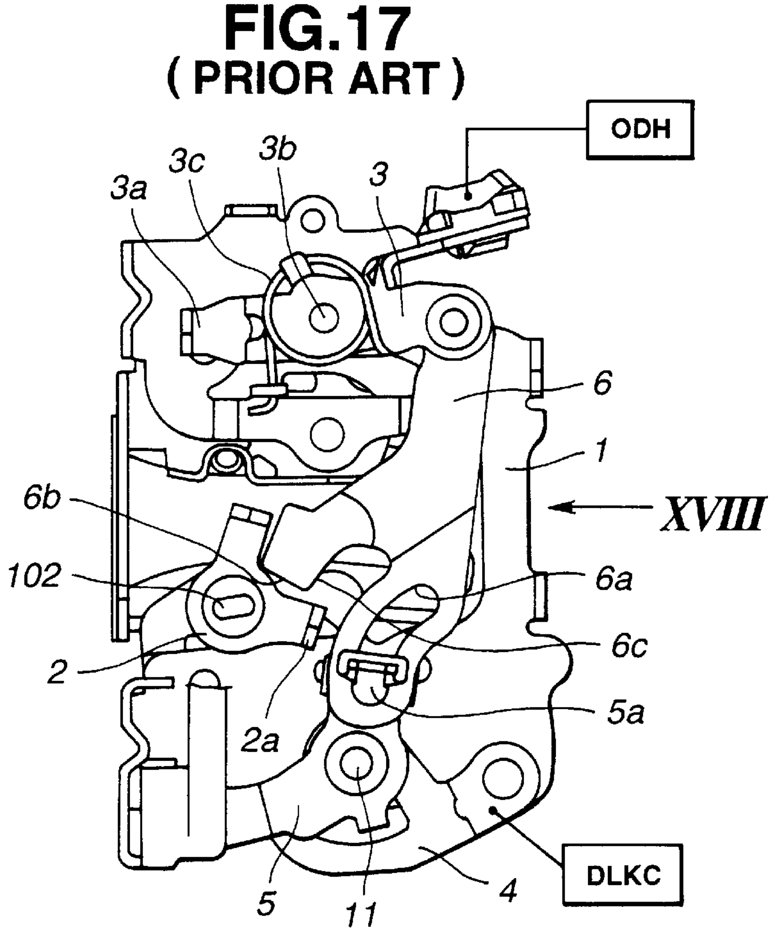
FIG.17 (PRIOR ART)
FIG. 17 is a front view of a conventional automotive door lock device.
Figure 18:
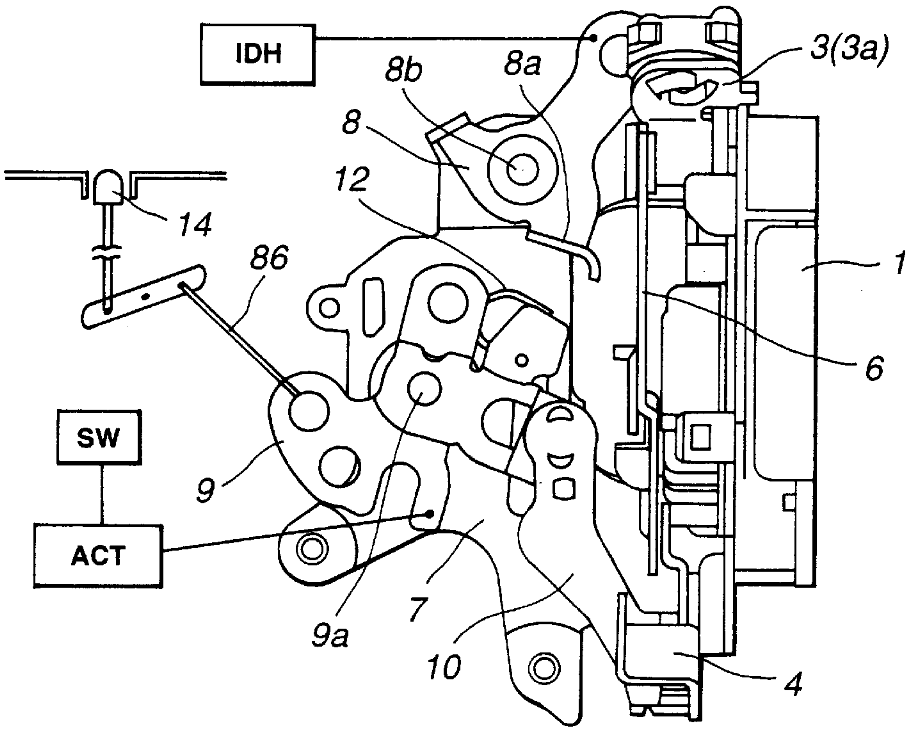
FIG.18 (PRIOR ART)
FIG. 18 is a view taken from the direction of the arrow "XVIII" of FIG. 17.
Figure 19:
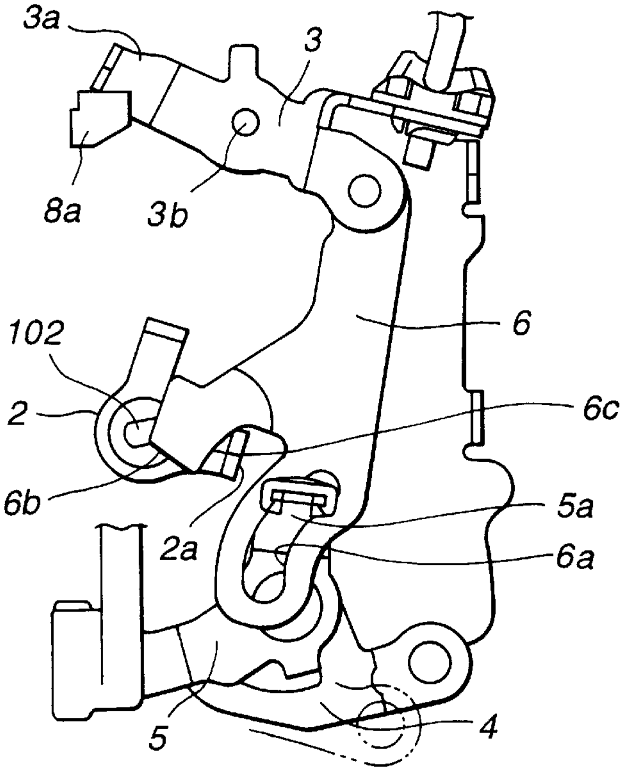
FIG.19 (PRIOR ART)
FIG. 19 is a front view of essential parts of the conventional door lock device under a condition wherein a sub-lever is inoperatively moved.

Referring to FIGS. 14 to 16, there is shown an automotive door lock device 100D which is a fourth embodiment of the present invention.

The lock device 100D of this fourth embodiment is substantially the same as that of the above-mentioned third embodiment 100C except the shapes of some levers used therein. Substantially same parts as those of the third embodiment 100C are denoted by the same numerals.

As will be understood when comparing FIG. 11 (third embodiment 100C) and FIG. 14 (fourth embodiment 100D), in the fourth embodiment 100D, a unit consisting of the first and second sub-levers 61 and 62 is arranged to move over an imaginary plane which is perpendicular to a pivot axis (viz., the shaft 102) of the open lever 2. More specifically, during upward movement of the unit over the imaginary plane, the actuating arm 62*a* of the second sub-lever 62 can push up the engaging lug 2*a* of the open lever 2. Furthermore, in the fourth embodiment 100D, the first and second sub-levers (4) and (5) and the knob lever (9) which are employed in the third embodiment 100C are united as a single lock/unlock lever 5. The arm portion 8*a* is pivotally connected to the inside lever 8, which is contactable with the arm portion 3*a* of the release lever 3.

Furthermore in the fourth embodiment 100D, as is seen from FIG. 14, the inside lever 8 is formed with a projection 8*c* which serves as the connecting bar (90) of the third embodiment 100C. That is, due to provision of the projection 8*c*, the pivoting of the inside lever 80 in the lock canceling direction induces a pivoting of the lock/unlock lever 5 from the lock position to the unlock position. The pivoting of the lock/unlock lever 5 in the locking or unlocking direction has no effect on the inside lever 80.

Operation of the fourth embodiment 100D will be described in the following.

When, with the door being kept locked, the inside lever 8 is pivoted in a counterclockwise direction in FIG. 14 due to manipulation of the outside or inside door handle ODH or IDH, the projection 8*c* becomes in abutment with the lock/unlock lever 5 to push the same from the lock position to the unlock position.

When, with the lock/unlock lover 5 assuming the lock position, the inside or outside door handle IDH or ODH is manipulated, the release lever 3 is pivoted in a direction to push up the first and second sub-levers 61 and 62. During this, the actuating arm 62*a* of the second sub-lever 62 has no effect on the engaging lug 2*a* of the open lever 2.

When, under this condition, the lock/unlock lever 5 is pivoted from the lock position to the unlock position due to pivoting the inside lever 8 or manipulation of the door lock/unlock switch SW in the door unlocking direction, only the first sub-lever 61 is permitted to move toward its unlock position against he force of the spring 64 because the movement of the second sub-lever 62 is suppressed by the engagement between the edge 62*b* of the actuating arm 62*a* and the engaging lug 2*a* of the open lever 2. That is, during the movement of the first sub-lever 61, the second sub-lever 62 is pivoted away from the first sub-lever 61 against the force of the spring 64.

When thereafter the outside or inside door handle ODH or IDH is released from the passenger's hand, the first and second sub-levers 61 and 62 are moved down toward their original lower positions wherein the edge 62*b* of the actuating arm 62*a* disengages from the engaging lug 2*a* of the open lever 2 causing the second sub-lever 62 to pivot to its unlock position due to force of the spring 64. That is, the second sub-lever 62 takes the normally set position relative to the first sub-lever 61.

Thus, when thereafter the outside or inside door handle ODH or IDH is manipulated again, the actuating arm 62*a* of the second sub-lever 62 can abut against and push up the engaging lug 2*a* of the open lever 2. With this, the stopper pawl releases the latch plate and thus the door can be opened. It is to be noted that the lock device 100D of the fourth embodiment has the same advantages as those of the third embodiment 100C.

In the following, advantageous operations assured by the above-mentioned four embodiments 100A, 100B, 100C and 100D of the invention will be briefly described.

In the first and second embodiments 100A and 100B, even when, with the door being kept locked, the door unlocking manipulation of the door lock/unlock switch SW is carried out just after the door opening manipulation of the outside or inside door handle ODH or IDH thereby to induce a jammed condition of the door lock, the door can be unlocked by carrying out the door opening manipulation of the outside or inside door handle ODH or IDH again without repeating the door unlocking manipulation of the door lock/unlock switch SW.

In the third and fourth embodiments 100C and 100D, in addition to the advantageous operation of the first and second embodiments 100A and 100B, another advantageous operation is obtained. That is, the locked condition of door can be cancelled by carrying out the manipulation of the inside door handle IDH twice.

The entire contents of Japanese Patent Application P9-335310 (filed Dec. 5, 1997) and Japanese Patent Application P9-335945 (filed Dec. 5, 1997) are incorporated herein by reference.

Although the invention has been described above by reference to certain embodiments of the invention, the invention is not limited to the embodiments described above. Modifications and variations of the embodiments described above will occur to those skilled in the art, in light of the above teachings.

What is claimed is:

1. An automotive door lock device comprising:

an open lever pivotal between a door latch position and a door unlatch position, said open lever having an engaging lug;

a lock/unlock lever pivotal between lock and unlock positions;

a release lever pivotal between first and second positions;

a first sub-lever having one end pivotally connected to said release lever and the other end pivotally connected to said lock/unlock lever;

a second sub-lever having one end pivotally connected to said first sub-lever and the other end formed with an actuating arm, said actuating arm being engageable with said engaging lug of said open lever; and biasing means for biasing said second sub-lever toward said first sub-lever, wherein when said lock/unlock lever assumes said unlock position, the pivoting of said release lever from said first position to said second position induces an abutment of said actuating arm with said engaging lug of said open lever thereby to pivot a stopper pawl toward said door unlatch position, and when said lock/unlock lever assumes said lock position, the pivoting of said release lever from said first position to said second position fails to induce such abutment, and wherein when, with said actuating arm being abnormally engaged with said engaging lug, said lock/unlock lever is pivoted from said lock position to said unlock position, only said first sub-lever is permitted to move toward its unlock position against the force of said basing means keeping the abnormal engagement of said actuating arm with said engaging lug.

2. An automotive door lock device as claimed in claim 1, in which said actuating arm of said second sub-lever is formed with a side edge which is in abutment with said engaging lug of said open lever when said actuating arm is abnormally engaged with said engaging lug.

3. An automotive door lock device as claimed in claim 1, in which second sub-lever is formed with a raised stopper which abuts against a side edge of said first sub-lever when, due to the force of said biasing means, said second sub-lever is forced to assume a normally set position relative to said first sub-lever.

4. An automotive door lock device as claimed in claim 1, in which said biasing means is a coil spring disposed about a pivot shaft through which said second sub-lever is pivotally connected to said first sub-lever, said coil spring having one end hooked to said first sub-lever and the other end hooked to said second sub-lever.

5. An automotive door lock device as claimed in claim 1, in which said lock/unlock lever is adapted to be controlled by a door lock/unlock switch arranged near a driver's seat, and said release lever is adapted to be controlled by a door handle.

6. An automotive door lock device as claimed in claim 5, in which said lock/unlock lever is adapted to be controlled by a door lock key cylinder.

7. An automotive door lock device as claimed in claim 1, in which a unit consisting of said first and second sub-levers is arranged to move over an imaginary plane which is perpendicular to a pivot axis of said open lever.

8. An automotive door lock device as claimed in claim 1, further comprising:

an inside lever which pivots said release lever from said first position to said second position when an inside door handle is manipulated for the purpose of opening the door; and a movement transmitting means which pivots said lock/unlock lever from said lock position to said unlock position upon manipulation of said inside door handle.

9. An automotive door lock device as claimed in claim 8, in which said movement transmitting means comprises:

a pivotal knob lever linked to said lock/unlock lever, said pivotal knob lever being actuated by a door lock knob and a door lock/unlock switch;

a first arcuate slot formed in said inside lever;

a second arcuate slot formed in said pivotal knob lever; and a connecting bar having one end slidably engaged with said first arcuate slot and the other end slidably engaged with said second arcuate slot.

10. An automotive door lock device as claimed in claim 8, in which said movement transmitting means comprises a projection formed on said inside lever, said projection being brought into abutment with one edge of said lock/unlock lever to pivot the lock/unlock lever when said inside lever is pivoted upon manipulation of said inside door handle.

* * * * *